US008515659B2

(12) United States Patent
Kindo et al.

(10) Patent No.: US 8,515,659 B2
(45) Date of Patent: Aug. 20, 2013

(54) COLLISION POSSIBILITY ACQUIRING DEVICE, AND COLLISION POSSIBILITY ACQUIRING METHOD

(75) Inventors: Toshiki Kindo, Yokohama (JP); Kazuaki Aso, Susono (JP); Masahiro Harada, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 309 days.

(21) Appl. No.: 12/514,539

(22) PCT Filed: Mar. 26, 2008

(86) PCT No.: PCT/JP2008/056529

§ 371 (c)(1), (2), (4) Date: May 12, 2009

(87) PCT Pub. No.: WO2008/120796

PCT Pub. Date: Oct. 9, 2008

(65) Prior Publication Data

US 2010/0030472 A1 Feb. 4, 2010

(30) Foreign Application Priority Data

Mar. 29, 2007 (JP) ................................ 2007-088842

(51) Int. Cl.
*G05D 23/00* (2006.01)

(52) U.S. Cl.
USPC .......................................................... 701/300

(58) Field of Classification Search
USPC .......................................................... 701/300
See application file for complete search history.

(56) References Cited

U.S. PATENT DOCUMENTS

| | | | | |
|---|---|---|---|---|
| 5,332,057 | A | 7/1994 | Butsuen et al. | |
| 5,572,428 | A | 11/1996 | Ishida et al. | |
| 5,617,048 | A | 4/1997 | Ward et al. | |
| 6,026,347 | A | 2/2000 | Schuster | |
| 6,084,508 | A | 7/2000 | Mai et al. | |
| 6,169,495 | B1 | 1/2001 | Koike | |
| 6,269,307 | B1 | 7/2001 | Shinmura et al. | |
| 6,571,176 | B1 | 5/2003 | Shinmura et al. | |
| 6,662,108 | B2 * | 12/2003 | Miller et al. | 701/301 |
| 7,167,787 | B2 | 1/2007 | Bastian et al. | |

(Continued)

FOREIGN PATENT DOCUMENTS

| | | | |
|---|---|---|---|
| DE | 102 57 842 | A1 | 11/2003 |
| DE | 10 2005 020 731 | A1 | 11/2006 |

(Continued)

OTHER PUBLICATIONS

Broadhearst et al, "Monte Carlo Road Safety Reasoning", Monte Carlo road safety reasoning, Proceedings of the IEEE Intelligent Vehicles Symposium 2005, Jun. 6-8, 2005, pp. 319-324, Las Vegas, Nev., USA.*

(Continued)

*Primary Examiner* — Mark Fadok
(74) *Attorney, Agent, or Firm* — Oliff & Berridge, PLC

(57) ABSTRACT

An own vehicle risk acquiring ECU 1 acquires a predicted track of an own vehicle and calculates and acquires a plurality of tracks of the other vehicle about the own vehicle. According to the predicted track of the own vehicle and the plurality of tracks of the other vehicle, a collision probability of the own vehicle is calculated as a collision possibility.

10 Claims, 7 Drawing Sheets

(56) References Cited

U.S. PATENT DOCUMENTS

| | | | | |
|---|---|---|---|---|
| 7,369,941 | B2 * | 5/2008 | Schiffmann et al. | 701/301 |
| 7,734,419 | B2 * | 6/2010 | Kondoh | 701/301 |
| 7,961,084 | B2 * | 6/2011 | Aso et al. | 340/436 |
| 2002/0087241 | A1 * | 7/2002 | Nakano et al. | 701/41 |
| 2002/0135467 | A1 | 9/2002 | Koike | |
| 2002/0140551 | A1 * | 10/2002 | Gutta et al. | 340/435 |
| 2003/0006889 | A1 | 1/2003 | Koike | |
| 2003/0009275 | A1 | 1/2003 | Koike | |
| 2003/0204299 | A1 * | 10/2003 | Waldis et al. | 701/96 |
| 2004/0090117 | A1 * | 5/2004 | Dudeck et al. | 303/191 |
| 2004/0193351 | A1 | 9/2004 | Takahashi et al. | |
| 2005/0015203 | A1 | 1/2005 | Nishira | |
| 2005/0019770 | A1 | 1/2005 | Mattiasson et al. | |
| 2005/0073438 | A1 * | 4/2005 | Rodgers et al. | 340/944 |
| 2005/0197770 | A1 * | 9/2005 | Schiffmann et al. | 701/301 |
| 2005/0209766 | A1 | 9/2005 | Perisho et al. | |
| 2005/0225477 | A1 * | 10/2005 | Cong et al. | 342/70 |
| 2006/0111838 | A1 | 5/2006 | Hughes | |
| 2006/0247852 | A1 * | 11/2006 | Kortge et al. | 701/209 |
| 2007/0027597 | A1 | 2/2007 | Breuel et al. | |
| 2007/0106475 | A1 * | 5/2007 | Kondoh | 701/301 |
| 2007/0192006 | A1 | 8/2007 | Kimura et al. | |
| 2008/0065328 | A1 * | 3/2008 | Eidehall et al. | 701/301 |
| 2008/0086269 | A1 | 4/2008 | Joe et al. | |
| 2008/0097699 | A1 | 4/2008 | Ono | |
| 2008/0281521 | A1 | 11/2008 | Shirato | |
| 2009/0143987 | A1 * | 6/2009 | Bect et al. | 701/301 |
| 2010/0030472 | A1 | 2/2010 | Kindo et al. | |

FOREIGN PATENT DOCUMENTS

| | | | |
|---|---|---|---|
| EP | 1 898 232 | A1 | 3/2008 |
| FR | 2889882 | * | 2/2007 |
| JP | A-03-118698 | | 5/1991 |
| JP | A-07-104062 | | 4/1995 |
| JP | A-08-335298 | | 12/1996 |
| JP | A-09-132093 | | 5/1997 |
| JP | A-10-105895 | | 4/1998 |
| JP | A-11-120488 | | 4/1999 |
| JP | A-11-126294 | | 5/1999 |
| JP | A-11-345393 | | 12/1999 |
| JP | A-2000-276696 | | 10/2000 |
| JP | A-2002-260146 | | 9/2002 |
| JP | A-2004-145479 | | 5/2004 |
| JP | A-2004-224309 | | 8/2004 |
| JP | A-2004-240506 | | 8/2004 |
| JP | A-2005-228264 | | 8/2005 |
| JP | A-2006-154967 | | 6/2006 |
| JP | A-2006-185137 | | 7/2006 |
| JP | A-2006-185139 | | 7/2006 |
| JP | A-2006-252136 | | 9/2006 |
| JP | A-2006-277256 | | 10/2006 |
| JP | A-2007-034684 | | 2/2007 |
| JP | A-2007-534041 | | 11/2007 |
| JP | A-2008-132867 | | 6/2008 |
| JP | 2008-308152 | | 12/2008 |
| JP | A-2009-505260 | | 2/2009 |
| WO | WO 2005/027076 | A1 | 3/2005 |
| WO | WO 2005/037592 | A1 | 4/2005 |
| WO | WO 2006/070865 | A1 | 7/2006 |
| WO | WO 2007/020358 | A2 | 2/2007 |
| WO | WO 2008/120796 | A1 | 10/2008 |
| WO | WO 2009/007843 | A2 | 1/2009 |

OTHER PUBLICATIONS

Bect et al, Translation of French Patent FR2889882 from Google translations on Aug. 30, 2012, Publication date of Patent is Feb. 3, 2007.*

Broadhurst et al., "Monte Carlo Road Safety Reasoning," *IEEE Intelligent Vehicle Symposium,* Jun. 2005, No. 4, pp. 319-324.

Extended Search Report issued in corresponding European Application No. 08799743.3, mailed Sep. 22, 2010.

Japanese Patent Office, Notice of Reasons for Rejection mailed Nov. 8, 2011 in Japanese Patent Application No. 2009-507554 w/English-language Translation.

Oct. 20, 2009 International Preliminary Report on Patentability issued in International Patent Application No. PCT/JP2008/056529.

Japanese Patent Office, Office Action issued on May 8, 2012 in Japanese Patent Application No. 2009-507554.

Japanese Patent Office, Office Action mailed Nov. 13, 2012 in Japanese Patent Application No. P2009-507554.

Oct. 17, 2012 Office Action issued in U.S. Appl. No. 12/452,395.

U.S. Appl. No. 12/714,728 in the name of Katsuhiro Sakai filed on Mar. 1, 2010.

* cited by examiner

COLLISION POSSIBILITY ACQUIRING DEVICE, AND COLLISION POSSIBILITY ACQUIRING METHOD

TECHNICAL FIELD

The present invention relates to a collision possibility acquiring apparatus and a collision possibility acquiring method which acquire a possibility of an own vehicle colliding with obstacles such as other vehicles.

BACKGROUND ART

Collision possibility acquiring apparatus which detect an obstacle about the own vehicle and determine a collision possibility between the own vehicle and the obstacle have conventionally been known. An example of techniques using such a collision possibility acquiring apparatus is a collision preventing apparatus. When there is a possibility of the own vehicle colliding with an obstacle, for example, the collision preventing apparatus evades the collision by informing the driver of the danger of collision or automatically controlling the own vehicle to decelerate (see, for example, Japanese Patent Application Laid-Open No. 7-104062).

DISCLOSURE OF INVENTION

However, when the obstacle is a mobile object such as another vehicle, the collision preventing apparatus disclosed in the above-mentioned Japanese Patent Application Laid-Open No. 7-104062 calculates only one predicted track of the obstacle. It has therefore been problematic in that, when the own vehicle or obstacle runs on a road or the like having many branches such as a crossroad, for example, the collision possibility is harder to calculate and lowers the accuracy thereof.

Hence, it is an object of the present invention to provide a collision possibility acquiring apparatus and a collision possibility acquiring method which can accurately calculate the collision possibility of the own vehicle even in circumstances where a track has many branches such as crossroads.

The collision possibility acquiring apparatus of the present invention having achieved the above-mentioned object comprises own vehicle track acquiring means for acquiring at least one track of an own vehicle, obstacle track acquiring means for acquiring a plurality of tracks of an obstacle about the own vehicle, and collision possibility acquiring means for acquiring a collision possibility between the own vehicle and obstacle according to the track of the own vehicle and the plurality of tracks of the obstacle.

The collision possibility acquiring apparatus in accordance with the present invention acquires a plurality of tracks of an obstacle about the own vehicle and acquires the possibility of the own vehicle and obstacle colliding with each other according to the track of the own vehicle and the plurality of tracks of the obstacle. Therefore, a plurality of tracks of the obstacle can be assumed, whereby the collision possibility of the own vehicle can accurately be calculated even in circumstances where a track has many branches such as crossroads.

The apparatus may further comprise risk output means for outputting the collision possibility as a risk.

The own vehicle track acquiring means may include own vehicle track predicting means for acquiring a predicted track of the own vehicle and acquire the predicted track as the track of the own vehicle.

When the predicting means thus obtains a predicted track as the track of the own vehicle, a collision possibility can be determined in a track where the own vehicle is supposed to run from now.

The collision possibility acquiring method of the present invention having achieved the above-mentioned object comprises an own vehicle track acquiring step of acquiring at least one track of an own vehicle, an obstacle track acquiring step of acquiring a plurality of tracks of an obstacle about the own vehicle, and a collision possibility acquiring step of acquiring a collision possibility between the own vehicle and obstacle according to the track of the own vehicle and the plurality of tracks of the obstacle.

The method may further comprise a risk outputting step of outputting the collision possibility as a risk.

The own vehicle track acquiring step may include an own vehicle track predicting step of acquiring a predicted track of the own vehicle, and acquire the predicted track as the track of the own vehicle.

Further scope of applicability of the present invention will become apparent from the detailed description given hereinafter. However, it should be understood that the detailed description and specific examples, while indicating preferred embodiments of the present invention, are given by illustration only, since various changes and modifications within the spirit and scope of the invention will become apparent to those skilled in the art from this detailed description.

DESCRIPTION OF EMBODIMENTS

Figure 1:
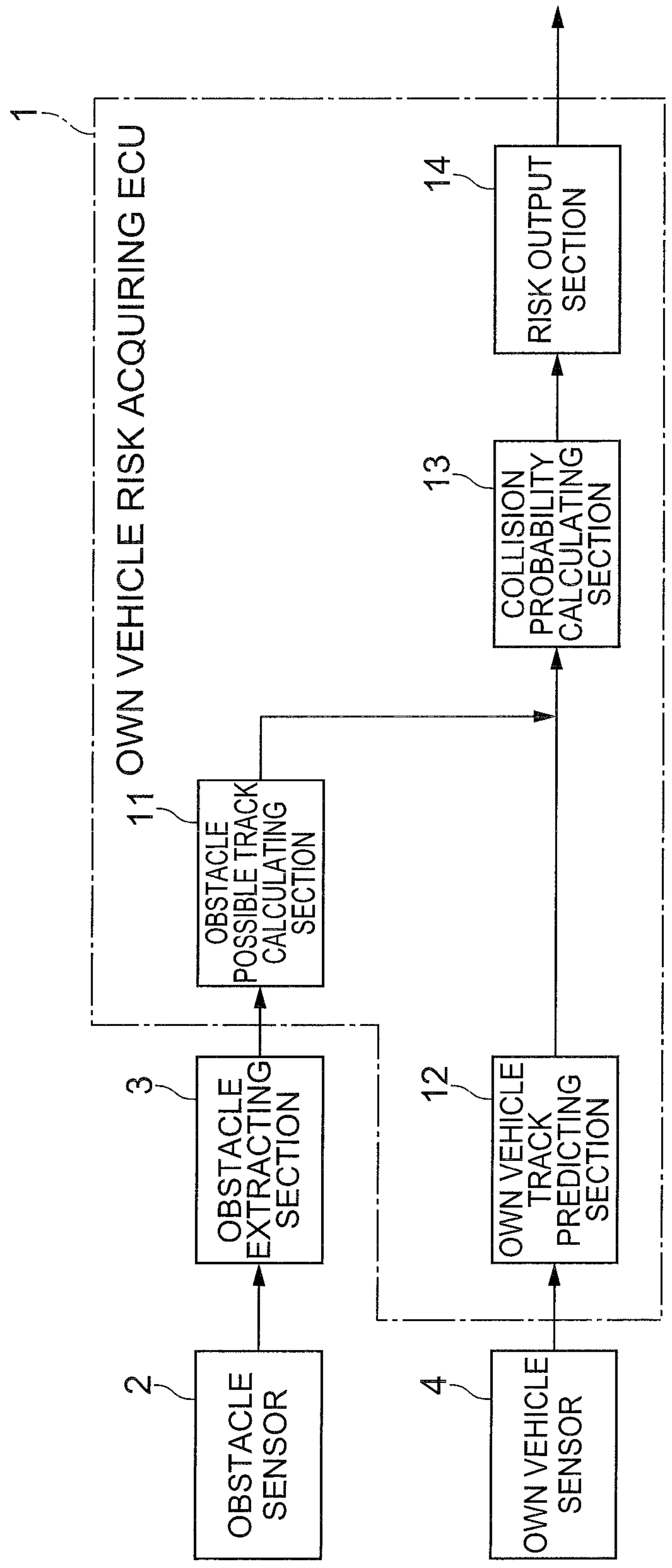
FIG. 1 is a block diagram illustrating the structure of an own vehicle risk acquiring apparatus in accordance with a first embodiment.

In the following, embodiments of the present invention will be explained with reference to the accompanying drawings. In the explanation of the drawings, the same constituents will be referred to with the same signs while omitting their overlapping descriptions. For convenience of illustration, ratios of dimensions in the drawings do not always coincide with those explained.

FIG. 1 is a block diagram illustrating the structure of an own vehicle risk acquiring ECU in accordance with the first embodiment. As illustrated in FIG. 1, the own vehicle risk acquiring ECU 1 as a collision possibility acquiring apparatus, which is a computer for automobile devices to be controlled electronically, is constituted by a CPU (Central Processing Unit), a ROM (Read Only Memory), a RAM (Random Access Memory), I/O interfaces, and the like. The own vehicle risk acquiring ECU 1 comprises an obstacle possible track calculating section 11, an own vehicle track predicting section 12, a collision probability calculating section 13, and a risk output section 14. An obstacle sensor 2 is connected through an obstacle extracting section 3 to the risk acquiring ECU 1, to which an own vehicle sensor 4 is also connected.

The obstacle sensor 2, which is constituted by a millimeter-wave radar sensor, a laser radar sensor, an image sensor, or the like, detects obstacles such as other vehicles and pedestrians about the own vehicle. The obstacle sensor 2 transmits obstacle-related information including information concerning the detected obstacles to the obstacle extracting section 3 in the own vehicle risk acquiring ECU 1.

The obstacle extracting section 3 extracts obstacles from the obstacle-related information transmitted from the obstacle sensor 2 and outputs obstacle information such as positions and moving speeds of the obstacles to the obstacle possible track calculating section 11 in the own vehicle risk acquiring ECU 1. When the obstacle sensor 2 is a millimeter-wave radar sensor or laser radar sensor, for example, the obstacle extracting section 3 detects the obstacles according to wavelengths of waves reflected by the obstacles and the like. When the obstacle sensor 2 is an image sensor, for example, obstacles such as other vehicles are extracted from within captured images by such a technique as pattern matching.

The own vehicle sensor 4, which is constituted by a speed sensor, a yaw rate sensor, or the like, detects information concerning a running state of the own vehicle. The own vehicle sensor 4 transmits running state information concerning the detected running state of the own vehicle to the own vehicle track predicting section 12 in the own vehicle risk acquiring ECU 1. Here, examples of the running state information of the own vehicle include the speed and yaw rate of the own vehicle.

The obstacle possible track calculating section 11, which stores a plurality of behaviors expected depending on the obstacles during a fixed period of time, acquires a plurality of predicted tracks of the obstacles according to the obstacle information issued from the obstacle extracting section 3 and the stored behaviors. The obstacle possible track calculating section 11 outputs obstacle track information concerning the calculated tracks of the obstacles to the collision probability calculating section 13.

According to the running state signal of the own vehicle transmitted from the own vehicle sensor 4, the own vehicle track predicting section 12 predicts and acquires a track of the own vehicle. Though one or a plurality of tracks of the own vehicle may be predicted, one track is predicted here. The own vehicle track predicting section 12 outputs own vehicle track information concerning the predicted track of the own vehicle to the collision probability calculating section 13.

According to the obstacle track information and own vehicle information issued from the obstacle possible track calculating section 11 and own vehicle track predicting section 12, respectively, the collision probability calculating section 13 calculates and acquires a collision probability which is a possibility of the own vehicle colliding with the obstacles. The collision probability calculating section 13 outputs collision probability information concerning the calculated collision probability to the risk output section 14.

The risk output section 14 determines a risk corresponding to the collision probability information issued from the collision probability calculating section 13 and outputs it to an alarm device or a running control device.

Figure 2:
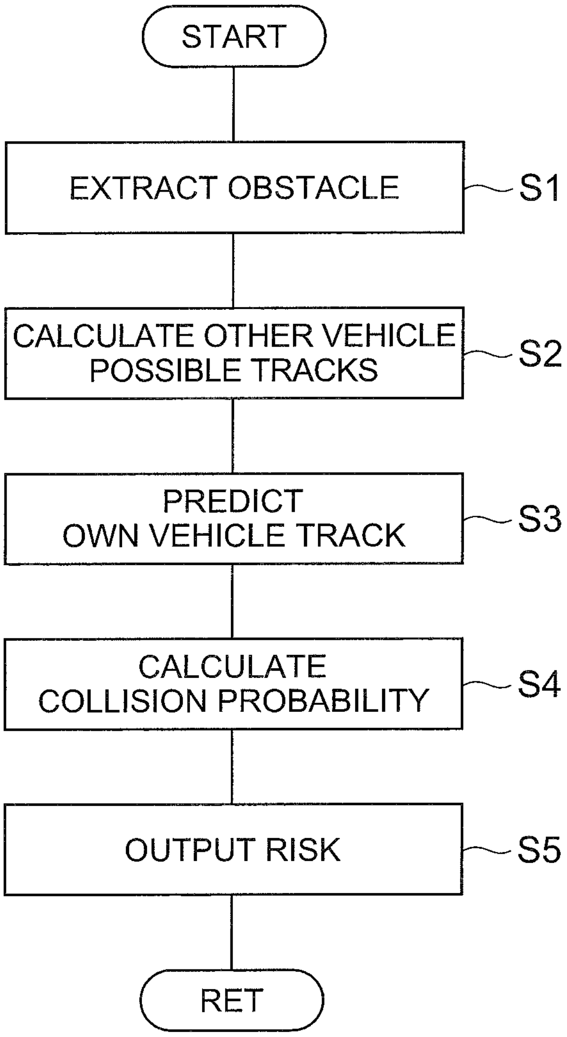
FIG. 2 is a flowchart illustrating an operation procedure of the own vehicle risk acquiring apparatus in accordance with the first embodiment.

Operations of the own vehicle risk acquiring apparatus in accordance with this embodiment will now be explained. FIG. 2 is a flowchart illustrating an operation procedure of the own vehicle risk acquiring apparatus.

In the own vehicle risk acquiring apparatus in accordance with this embodiment, as illustrated in FIG. 2, the obstacle extracting section 3 extracts obstacles about the own vehicle according to the obstacle-related information transmitted from the obstacle sensor 2 (S1). Here, other vehicles are extracted as the obstacles. When a plurality of other vehicles are included, all of them are extracted.

When the other vehicle as the obstacle is extracted, the obstacle possible track calculating section 11 calculates possible tracks where the other vehicle is movable as loci in a spatiotemporal system constituted by time and space for each other vehicle (S2). Here, as the possible tracks where the other vehicle is movable, the tracks of the other vehicle until the lapse of a predetermined moving time during which the other vehicle moves are determined instead of defining a certain arrival point and calculating possible tracks thereto. In general, no place is guaranteed safe beforehand on roads where the own vehicle runs, whereby collisions cannot reliably be evaded even when arrival points of the own vehicle and other vehicles are obtained in order to determine the collision possibility between the own vehicle and other vehicles.

Figure 3:
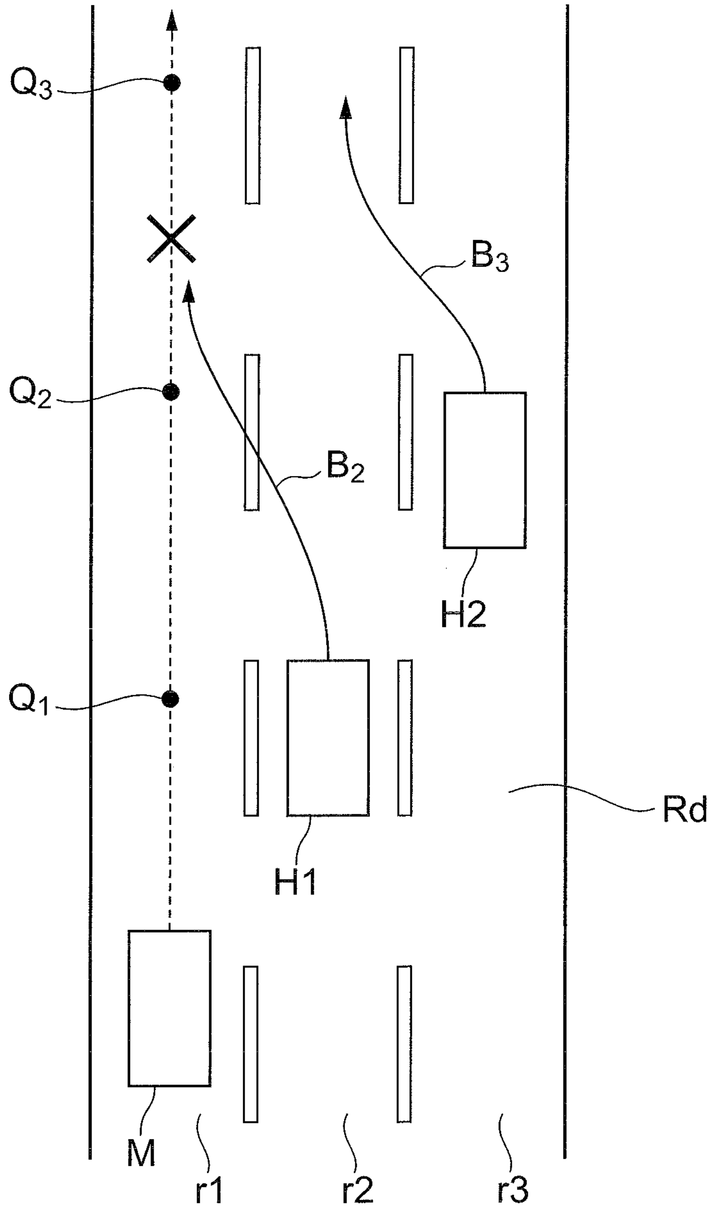
FIG. 3 is a schematic view schematically illustrating running states of the own vehicle and other vehicles.

For example, suppose that the own vehicle M, first other vehicle H1, and second other vehicle H2 run in the first, second, and third lanes r1, r2, r3, respectively, on a three-lane road R as illustrated in FIG. 3. Here, for preventing the own vehicle M from colliding with the other vehicles H1, H2 running in the second and third lanes r2, r3, respectively, it is considered preferable for the own vehicle M to reach positions Q1, Q2, Q3 in series. If the second other vehicle H2 takes a track B3 so as to move into the second lane r2, however, the first other vehicle H1 may take a track B2 in order to prevent it from colliding with the second other vehicle H2 and thus enter the first lane r1. In this case, the own vehicle M will have a risk of colliding with the first other vehicle H1 if running to reach the positions Q1, Q2, Q3 in series.

Figure 4:
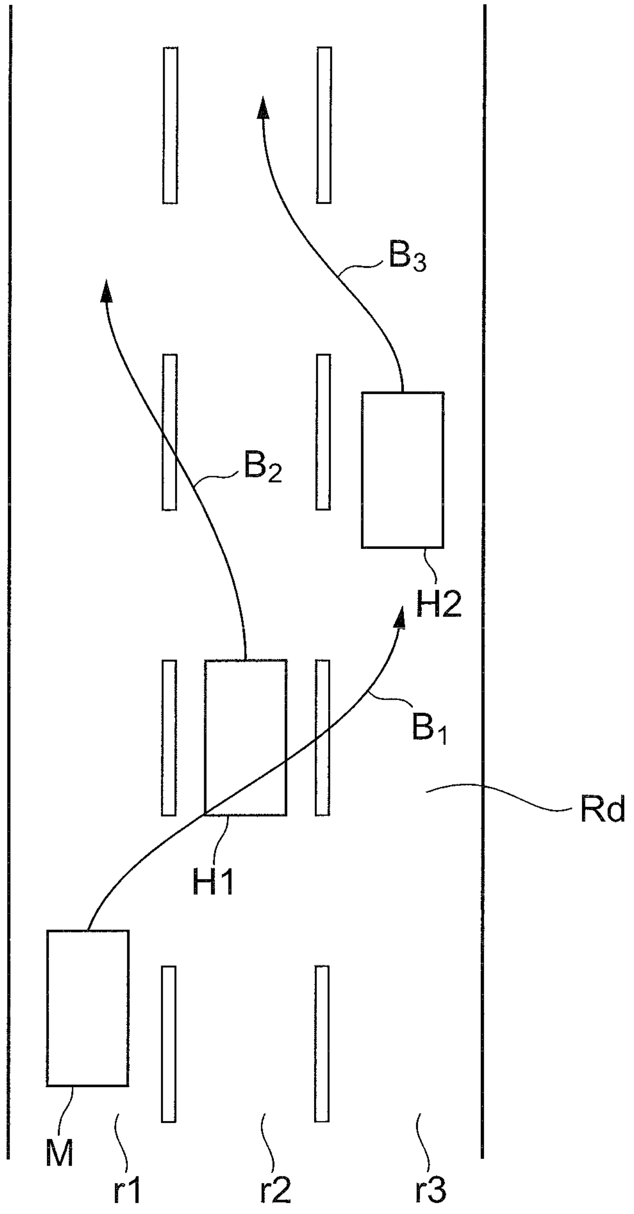
FIG. 4 is a schematic view schematically illustrating a running track obtainable by the own vehicle.

Therefore, instead of determining arrival positions for the own vehicle and other vehicles beforehand, tracks of the own vehicle and other vehicles are predicted each time. Predicting the tracks of the own vehicle and other vehicles each time allows the own vehicle to take a track B1 illustrated in FIG. 4, for example, whereby safety can be secured by accurately evading the risk at the time when the own vehicle M runs.

Instead of defining the lapse of a predetermined moving time during which the other vehicle moves, possible tracks of the other vehicle may be determined until a running distance of the other vehicle reaches a predetermined distance. In this case, the predetermined distance can appropriately be changed depending on the speed of the other vehicle (or the speed of the own vehicle).

The possible tracks of the other vehicles are calculated in the following manner for each of the other vehicles. An initializing process for setting the value of a counter k for identifying the other vehicle to 1 and the value of a counter n indicating the number of possible track generating operations for the same other vehicle to 1 is carried out. Subsequently, the position and moving state (speed and moving direction) of the other vehicle based on other vehicle information extracted from other-vehicle-related information transmitted from the obstacle sensor 2 are initialized.

Then, as a behavior of the other vehicle expected during a fixed time $\Delta t$ thereafter, one behavior is selected from a plurality of selectable behaviors according to respective behavior selection probabilities assigned to the behaviors beforehand. The behavior selection probability at the time of selecting one behavior is defined by correlating an element in a set of selectable behaviors and a predetermined random number to each other, for example. In this sense, different behavior selection probabilities may be assigned to respective behaviors or the same probability may be given to all the elements in the set of behaviors. The behavior selection probability may also be made dependent on positions and running states of the other vehicles or surrounding road environments.

The selection of the behavior of the other vehicle expected during the fixed time Δt based on such a behavior selection probability is repeatedly carried out, so as to choose the behavior of the other vehicle until the lapse of a predetermined moving time during which the other vehicle moves. From thus selected behavior of the other vehicle, one possible track of the other vehicle can be calculated.

When one possible track of the other vehicle is calculated, a plurality of (N) possible tracks of the other vehicle are calculated by the same procedure. Even when using the same procedure, different possible tracks are calculated in substantially all the cases since one behavior is selected according to the behavior selection probability assigned beforehand thereto. The number of possible tracks calculated here, which can be determined beforehand, may be 1000 (N=1000), for example. Other numbers of possible tracks, e.g., several hundreds to several ten thousands of them, may be calculated as a matter of course. Thus calculated possible tracks are employed as the predicted tracks of the other vehicle.

When there are a plurality of other vehicles extracted, possible tracks are calculated for each of them.

After calculating the possible tracks of the other vehicles, the own vehicle track predicting section 12 predicts a track of the own vehicle (S3). The track of the own vehicle is predicted according to the running state information issued from the own vehicle sensor 4. Alternatively, this may be done as in the calculation of the possible tracks of the other vehicles.

According to a behavior of the own vehicle expected to occur during the fixed time Δt, the track of the own vehicle is predicted from the running state of the vehicle determined by the speed and yaw rate transmitted from the own vehicle sensor 4. The behavior of the own vehicle expected to occur during the fixed time Δt is determined by using behavior selection probabilities assigned beforehand to a plurality of behaviors expected to be performed by the own vehicle with respect to the running state of the own vehicle at present.

For example, the behavior selection probabilities are set such that behaviors increasing the traveling distance of the own vehicle are more likely to be selected when the vehicle speed as the running state of the own vehicle at present is higher and behaviors orienting the own vehicle to the direction of the yaw rate are more likely to be selected when the yaw rate occurs leftward or rightward. Selecting the behavior by using the speed and yaw rate as the running state of the own vehicle makes it possible to predict the track of the own vehicle accurately. Alternatively, a vehicle speed and an estimated curve radius in the running state of the vehicle can be calculated from the speed and yaw rate transmitted from the own vehicle sensor 4, and the predicted track of the own vehicle can be determined from the vehicle speed and estimated curve radius.

After thus determining the predicted tracks of the other vehicle and own vehicle, the collision probability calculating section 13 calculates the collision probability between the own vehicle and other vehicle (S4). An example of the predicted tracks of the other vehicle and own vehicle determined in steps S2 and S3 is now represented by the three-dimensional space illustrated in FIG. 5. In the three-dimensional space in FIG. 5, vehicle positions are illustrated on the xy plane indicated by the x and y axes, while the t axis is set as a temporal axis. Therefore, the predicted tracks of the other vehicle and own vehicle can be represented by (x, y, t) coordinates, while loci obtained by projecting the respective tracks of the own vehicle and other vehicle onto the xy plane become running loci where the own vehicle and other vehicle are expected to run on the road.

Figure 5:
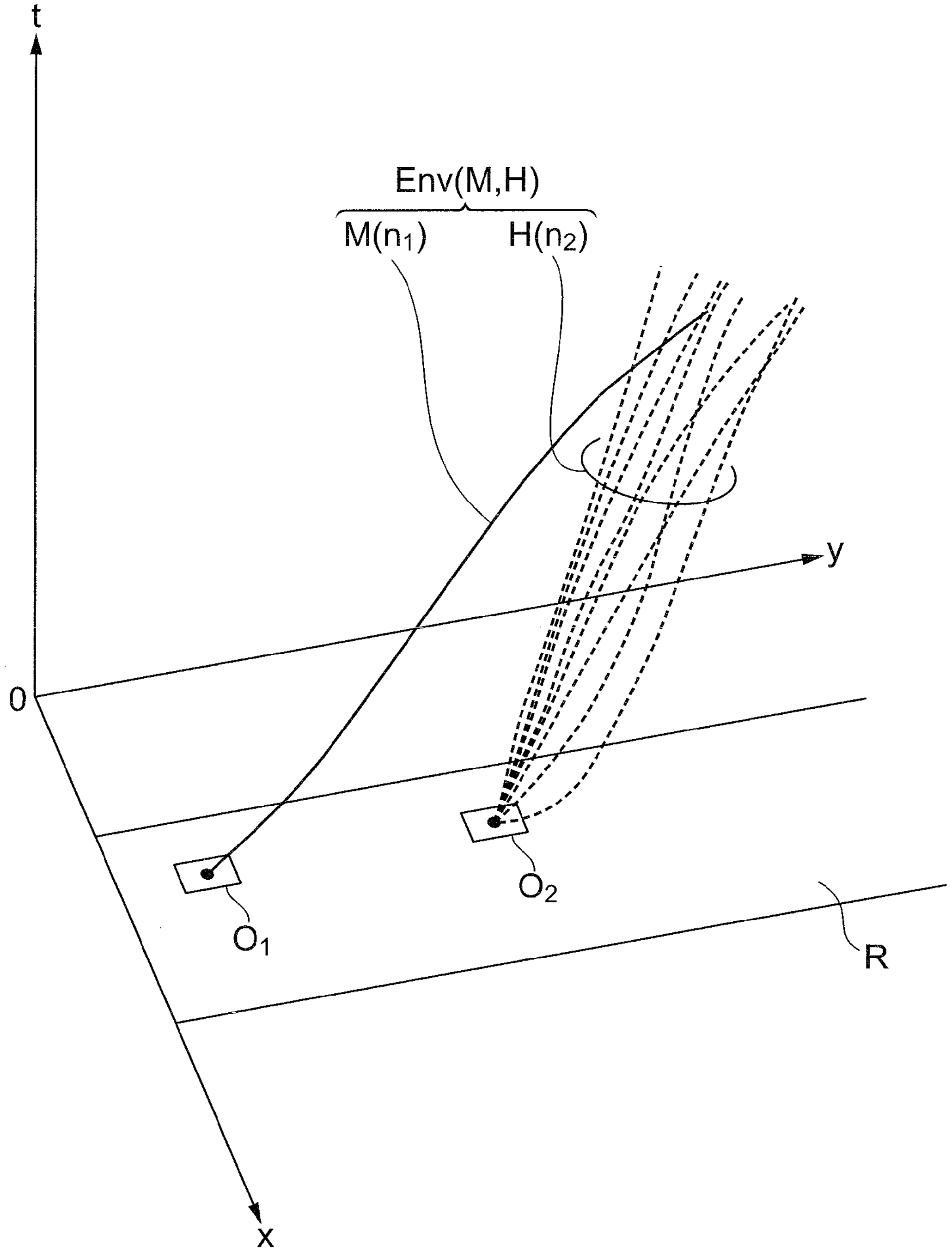
FIG. 5 is a graph illustrating the structure of a spatiotemporal environment.

Thus representing the predicted tracks of the own vehicle and other vehicle in the space illustrated in FIG. 5 forms a spatiotemporal environment constituted by a set of predicted tracks obtainable by a plurality of vehicles (the own vehicle and other vehicle) existing within a predetermined range of the three-dimensional spatiotemporal system. The spatiotemporal environment Env (M, H) illustrated in FIG. 5, which is a set of predicted tracks of the own vehicle M and other vehicle H, is constituted by the predicted track {M(n1)} of the own vehicle M and a predicted track set {H(n2)} of the other vehicle H. More specifically, the spatiotemporal environment (M, H) illustrates a spatiotemporal environment in the case where the own vehicle M and other vehicle H move in the +y direction on a flat and linear road R such as an expressway, Here, the respective predicted tracks of the own vehicle M and other vehicle H are determined independently of each other without taking account of their correlation and thus may intersect in the spatiotemporal system.

After thus determining the predicted tracks of the own vehicle M and other vehicle H, a probability of the own vehicle M and other vehicle H colliding with each other is determined. The own vehicle M and other vehicle H collide with each other when the predicted tracks of the own vehicle M and other vehicle H, which are determined according to predetermined behavior selection probabilities, intersect. Therefore, in a plurality of predicted tracks of the other vehicle H, the number of predicted tracks intersecting the predicted track of the own vehicle M can be employed as the collision probability of the own vehicle M and other vehicle H. When 5 out of 1000 predicted tracks of the other vehicle H calculated intersect the predicted track of the own vehicle M, a collision probability (collision possibility) $P_A$ of 0.5% is calculated. Conversely, the remaining 99.5% can be employed as a probability (non-collision possibility) of the own vehicle M and other vehicle H being kept from colliding with each other.

When a plurality of other vehicles are extracted as the other vehicle H, the collision probability $P_A$ of colliding with at least one of the plurality of other vehicles can be determined by the following expression (1):

$$P_A = 1 - \prod_{i=1}^{k} (1 - P_{Ai}) \tag{1}$$

where k is the number of extracted other vehicles, and $P_{Ak}$ is the probability of colliding with the kth vehicle.

Thus calculating a plurality of predicted tracks of the other vehicle H and predicting the collision probability between the own vehicle M and other vehicle H widely computes tracks obtainable by the other vehicle. Therefore, the collision probability can be calculated while taking account of cases where the track of the other vehicle changes greatly, e.g., when an accident or the like occurs in a place with branches such as a crossroad.

After thus obtaining the collision probability between the own vehicle and other vehicle, a risk is determined according to the collision probability calculated in the collision probability calculating section 13 and then is fed to an alarm device or a running control section (S5). The operations of the own vehicle risk acquiring apparatus are thus terminated.

As in the foregoing, the own vehicle risk acquiring apparatus in accordance with this embodiment calculates a plurality of possible tracks (predicted tracks) for other vehicles having a collision possibility, predicts a collision possibility between the own vehicle M and other vehicle H according to the plurality of possible tracks, and determines a risk of the own vehicle based on the collision possibility. Therefore, tracks obtainable by the other vehicles are calculated widely, whereby the collision possibility and risk of the own vehicle can be calculated accurately even in circumstances where a track has many branches such as crossroads. Also, the collision possibility and risk of the own vehicle can be calculated while taking account of cases where the track of the other vehicle changes greatly, e.g., when an accident or the like occurs at a crossroad. Hence, the collision possibility and risk usable for general purposes can be determined.

In the own vehicle risk acquiring apparatus in accordance with this embodiment, the predicted track obtained by the own vehicle track predicting section 12 is employed as the track of the own vehicle. Therefore, a risk about a track where the own vehicle is supposed to run from now can be determined. The predicted track is determined according to the running state of the own vehicle. Hence, the predicted track of the own vehicle can be determined accurately.

Figure 6:
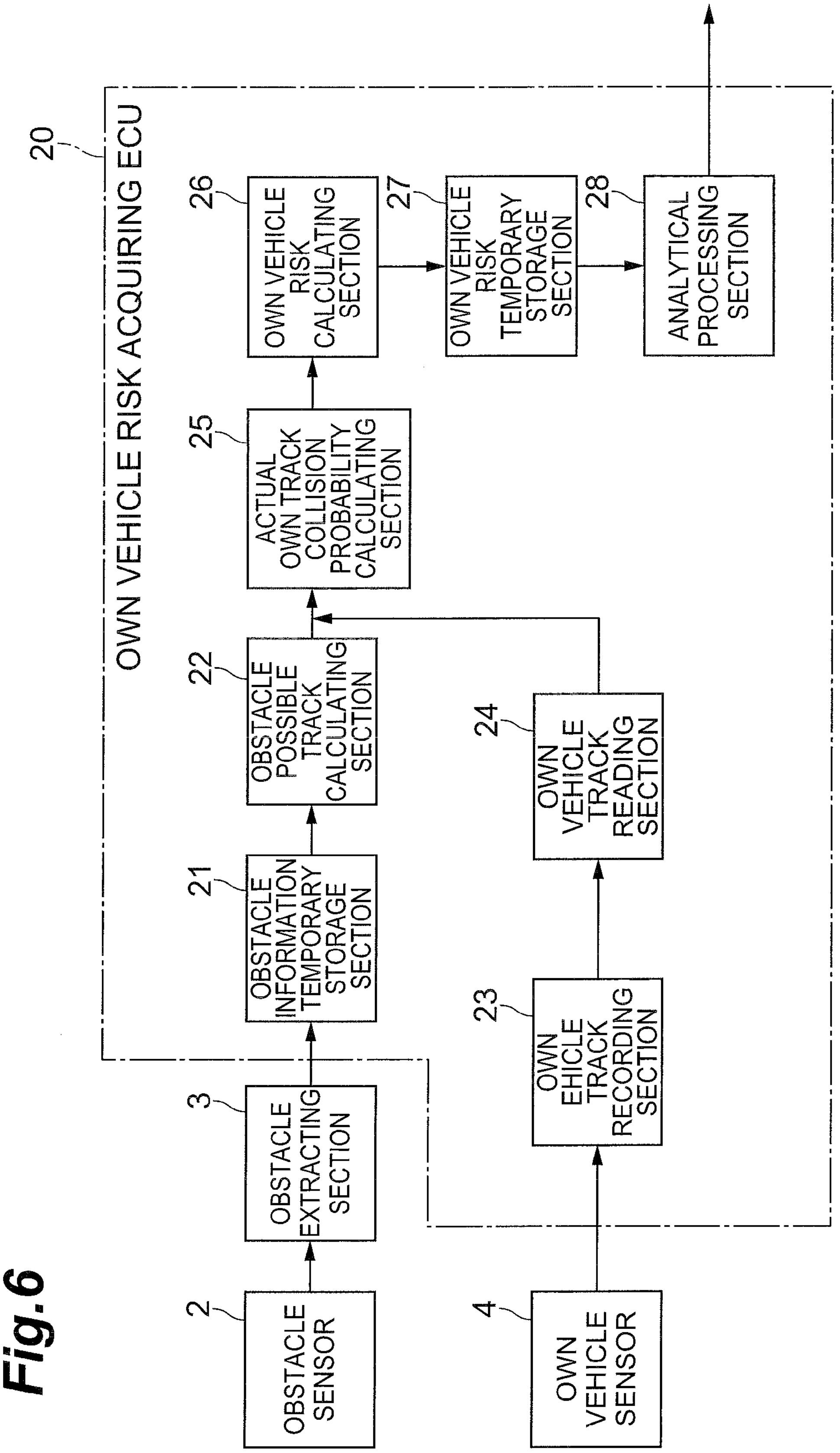
FIG. 6 is a block diagram illustrating the structure of an own vehicle risk acquiring apparatus in accordance with a second embodiment.

The second embodiment of the present invention will now be explained. FIG. 6 is a block diagram of the own vehicle risk acquiring apparatus in accordance with the second embodiment.

As illustrated in FIG. 6, the own vehicle risk acquiring ECU 20 as the own vehicle risk acquiring apparatus in accordance with this embodiment, which is a computer for automobile devices to be controlled electronically as in the above-mentioned first embodiment, is constituted by a CPU (Central Processing Unit), a ROM (Read Only Memory), a RAM (Random Access Memory), I/O interfaces, and the like. An obstacle sensor 2 is connected through an obstacle extracting section 3 to the own vehicle risk acquiring ECU 20, to which an own vehicle sensor 4 is also connected.

The own vehicle risk acquiring ECU 20 comprises an obstacle information temporary storage section 21, an obstacle possible track calculating section 22, an own vehicle track recording section 23, an own vehicle track reading section 24, an actual own track collision probability calculating section 25, an own vehicle risk calculating section 26, an own vehicle risk temporary storage section 27, and an analytical processing section 28.

The obstacle information temporary storage section 21 stores obstacle information transmitted from the obstacle extracting section 3 during a predetermined time, e.g., 5 sec. The obstacle possible track calculating section 22 reads the obstacle information of the last 5 sec stored in the obstacle extracting section 3 and calculates and acquires a plurality of tracks where the obstacle is expected to move during a fixed time thereafter according to the obstacle information of the 5 sec. The obstacle possible track calculating section 22 outputs obstacle track information concerning the calculated obstacle tracks to the actual own track collision probability calculating section 25.

According to running state information of the own vehicle transmitted from the own vehicle sensor 4, the own vehicle track recording section 23 records a history of the own vehicle track. The own vehicle track reading section 24 reads the history of the own vehicle track recorded in the own vehicle track recording section 23 during a predetermined time, e.g., 5 sec. Here, the predetermined time is the same as the time of the obstacle information stored in the obstacle information temporary storage section 21. According to the read history of the own vehicle track, the own vehicle track reading section 24 outputs own vehicle actual track information concerning an actual track which is the track actually taken by the own vehicle to the actual own track collision probability calculating section 25.

According to the obstacle track information and own vehicle actual track information issued from the obstacle possible track calculating section 22 and own vehicle track reading section 24, respectively, the actual own track collision probability calculating section 25 calculates and acquires a collision probability which was the possibility of the own vehicle colliding with the obstacle in the actual track during the last 5 sec. The actual own track collision probability calculating section 25 outputs collision probability information concerning the calculated collision probability to the own vehicle risk calculating section 26.

According to the collision probability information issued from the actual own track collision probability calculating section 25, the own vehicle risk calculating section 26 calculates an own vehicle risk. Here, the own vehicle risk is the collision probability when the own vehicle runs during the last 5 sec. The own vehicle risk calculating section 26 outputs own vehicle risk information concerning the calculated own vehicle risk to the own vehicle risk temporary storage section 27.

According to the own vehicle risk information issued from the own vehicle risk calculating section 26, the own vehicle risk temporary storage section 27 stores the own vehicle risk at present. The analytic processing section 28 analytically processes in time series the own vehicle risks stored in the own vehicle risk temporary storage section 27, thereby calculating an overall own vehicle risk. The overall own vehicle risk calculated here is fed to an alarm device or a running control device.

Figure 7:
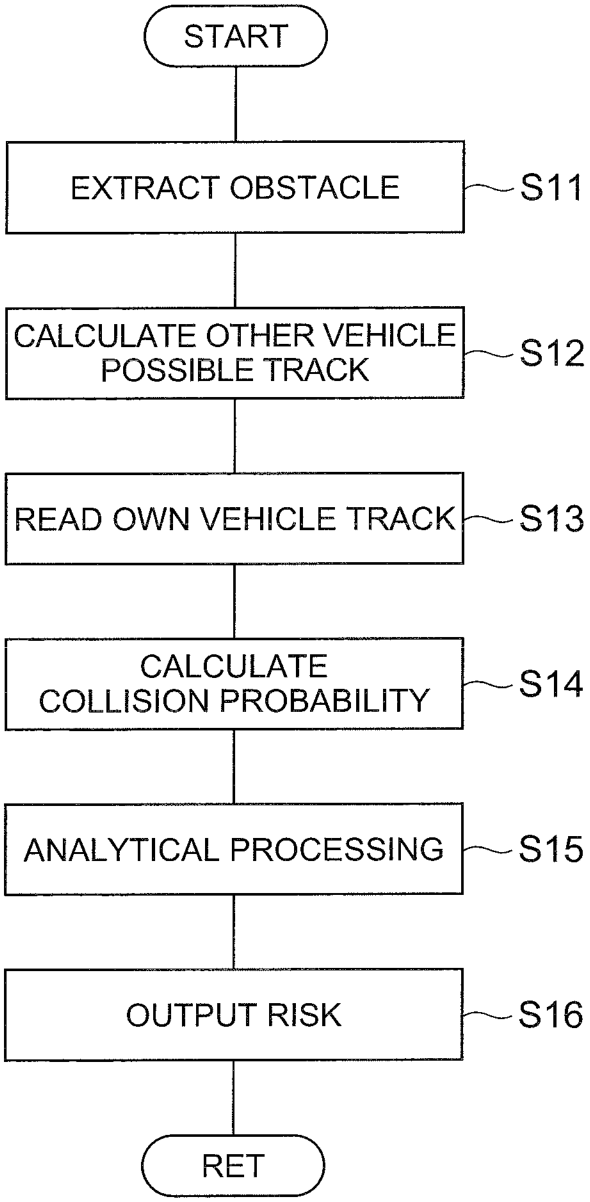
FIG. 7 is a flowchart illustrating an operation procedure of the own vehicle risk acquiring apparatus in accordance with the second embodiment.

Operations of the own vehicle risk acquiring apparatus in accordance with this embodiment will now be explained. FIG. 7 is a flowchart illustrating an operation procedure of the own vehicle risk acquiring apparatus.

In the own vehicle risk acquiring apparatus in accordance with this embodiment, as illustrated in FIG. 7, the obstacle extracting section 21 extracts obstacles about the own vehicle according to the obstacle-related information transmitted from the obstacle sensor 2 (S11). Here, other vehicles are extracted as the obstacles. When a plurality of other vehicles are included, all of them are extracted.

When the other vehicle as the obstacle is extracted, the obstacle information temporary storage section 21 stores other vehicle information concerning the extracted other vehicle and, according to the other vehicle information of the last 5 sec stored in the obstacle information temporary storage section 21, the obstacle possible track calculating section 22 calculates possible tracks where the other vehicle is movable as loci in a spatiotemporal system constituted by time and space for each other vehicle (S12). In the procedure of calculating the possible tracks where the other vehicle is movable, a plurality of tracks until the lapse of a predetermined moving time during which the other vehicle moves are determined as in the above-mentioned first embodiment.

After calculating the possible tracks of the other vehicle, the own vehicle track reading section 24 reads the track of the own vehicle in the last 5 sec recorded in the own vehicle track recording section 23 (S13). The own vehicle track reading section 24 outputs own vehicle actual track information concerning the read actual track of the own vehicle in the last 5 sec to the actual own track collision probability calculating section 25.

Subsequently, the actual own track collision probability calculating section calculates a collision probability between the own vehicle and other vehicle (S14). Here, according to the obstacle track information issued from the obstacle possible track calculating section 22, a plurality of predicted tracks of the other vehicle are determined at each of times when information of the other vehicle is detected in the last 5 sec. Also, according to the own vehicle actual track information issued from the own vehicle track reading section 24, the actual track where the own vehicle actually traveled during the last 5 sec is determined. Then, the plurality of predicted tracks of the other vehicle and the actual track where the own vehicle actually traveled are compared with each other, and a collision probability permitted by the own vehicle during the last 5 sec is calculated.

After determining the collision probability permitted by the own vehicle, the own vehicle risk calculating section 26 obtains the collision probability calculated by the actual own track collision probability calculating section 25 as an own vehicle risk and stores it into the own vehicle risk temporary storage section 27. Thereafter, the analytical processing section 28 analytically processes the own vehicle risk stored in the own vehicle risk temporary storage section 27 (S15), thereby calculating a final risk. Then, the calculated risk is fed to an alarm device or a running control section (S16). Thus, the operations of the own vehicle risk acquiring apparatus are terminated.

As in the foregoing, the own vehicle risk acquiring apparatus in accordance with this embodiment calculates a plurality of possible tracks (predicted tracks) at a time in the past for the other vehicle having a collision possibility, determines a collision possibility between the own vehicle and other vehicle in the past according to the plurality of possible tracks, and obtains a risk thereafter according to the collision possibility. Therefore, tracks obtainable by the other vehicles are calculated widely, whereby the collision possibility and risk of the own vehicle can be calculated accurately even in circumstances where a track has many branches such as crossroads. Also, the collision possibility and risk of the own vehicle can be calculated while taking account of cases where the track of the other vehicle changes greatly, e.g., when an accident or the like occurs at a crossroad.

Though preferred embodiments of the present invention are explained in the foregoing, the present invention is not limited to the above-mentioned embodiments. For example, the obstacles are not limited to other vehicles as assumed in the above-mentioned embodiments, but may be organisms such as pedestrians. Though the first embodiment predicts only one track for the own vehicle, a plurality of tracks may be predicted for the own vehicle. Predicting a plurality of tracks for the own vehicle can control the running of the own vehicle so as to make it pass a track with a lower risk in the predicted plurality of tracks by regulating its acceleration/deceleration and steering force, for example.

INDUSTRIAL APPLICABILITY

The present invention can be utilized in a collision possibility acquiring apparatus and a collision possibility acquiring method which acquire a possibility of an own vehicle colliding with obstacles such as other vehicles.

The invention claimed is:

1. A collision possibility acquiring apparatus for use with a host vehicle, comprising:

a controller that:

acquires at least one track of the host vehicle until the lapse of a predetermined moving time according to a host vehicle predicted behavior selected based on a predetermined behavior selection probability associated with the host vehicle predicted behavior;

acquires a plurality of tracks of an obstacle about the host vehicle until the lapse of the predetermined moving time, each of the plurality of tracks of the obstacle being determined according to an obstacle predicted behavior selected based on a predetermined behavior selection probability associated with the obstacle predicted behavior; and determines a collision possibility between the host vehicle and the obstacle based on the track of the host vehicle and the plurality of tracks of the obstacle.

2. The collision possibility acquiring apparatus according to claim 1, further comprising an output device for outputting the collision possibility as a risk.

3. The collision possibility acquiring apparatus according to claim 1, wherein the controller acquires a predicted track of the host vehicle as the track of the host vehicle.

4. The collision possibility acquiring apparatus according to claim 2, wherein the controller acquires a plurality of predicted tracks of the obstacle as the plurality of tracks of the obstacle.

5. The collision possibility acquiring apparatus according to claim 1, wherein each predetermined behavior selection probability is defined by correlating the associated predicted behavior with a predetermined random number.

6. A collision possibility acquiring method, comprising:

acquiring at least one track of a host vehicle until the lapse of a predetermined moving time according to a host vehicle predicted behavior selected based on a predetermined behavior selection probability associated with the host vehicle predicted behavior;

detecting an obstacle with an obstacle sensor;

acquiring a plurality of tracks of the obstacle about the host vehicle until the lapse of the predetermined moving time, each of the plurality of tracks of the obstacle being determined according to an obstacle predicted behavior selected based on a predetermined behavior selection probability associated with the predicted behavior; and determining with a controller a collision possibility between the host vehicle and the obstacle according to the track of the host vehicle and the plurality of tracks of the obstacle; and outputting with an output device the determined collision possibility in a manner perceivable by a driver of the host vehicle.

7. The collision possibility acquiring method according to claim 6, further comprising outputting the determined collision possibility as a risk.

8. The collision possibility acquiring method according to claim 6, further comprising acquiring a predicted track of the host vehicle as the track of the host vehicle.

9. The collision possibility acquiring method according to claim 7, further comprising acquiring a plurality of predicted tracks of the obstacle as the plurality of tracks of the obstacle.

10. The collision possibility acquiring method according to claim 6, wherein each predetermined behavior selection probability is defined by correlating the associated predicted behavior with a predetermined random number.

* * * * *